May 5, 1970          J. G. TRUMBLE          3,510,024

CAMPING UNIT FUEL TANK FILLER SPOUT ATTACHMENT

Original Filed Aug. 12, 1966          2 Sheets-Sheet 1

INVENTOR.
JOHN G. TRUMBLE

BY *Price & Heneveld*

ATTORNEYS

May 5, 1970   J. G. TRUMBLE   3,510,024
CAMPING UNIT FUEL TANK FILLER SPOUT ATTACHMENT
Original Filed Aug. 12, 1966   2 Sheets-Sheet 2
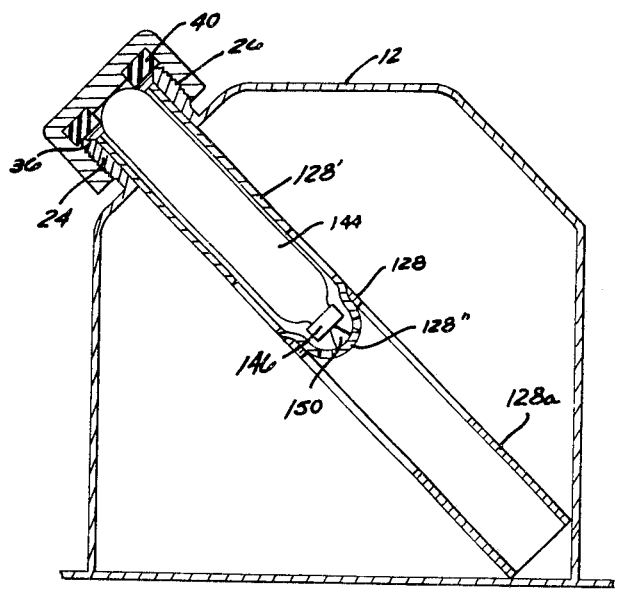
FIG. 5.
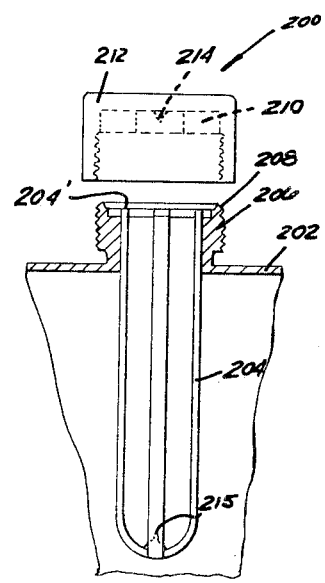
FIG. 6.
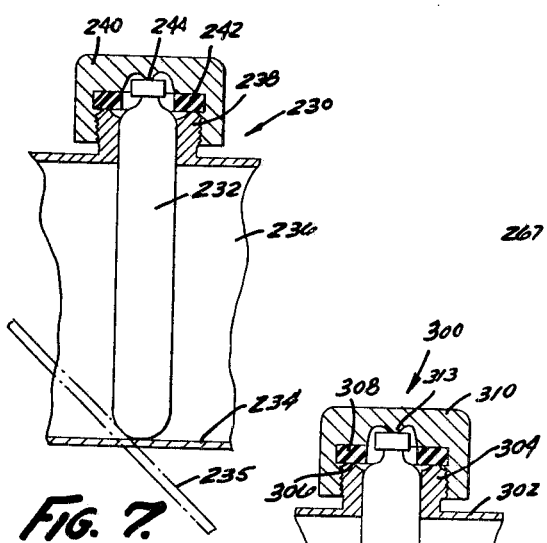
FIG. 7.
FIG. 9.
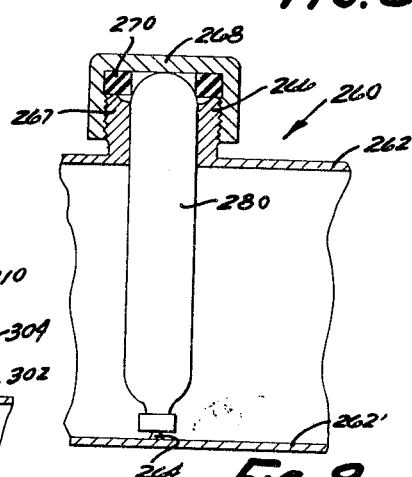
FIG. 8.
INVENTOR.
JOHN G. TRUMBLE
BY
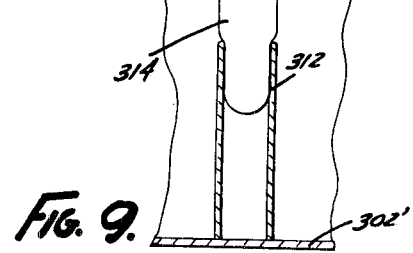
ATTORNEYS United States Patent Office 3,510,024
Patented May 5, 1970

3,510,024
CAMPING UNIT FUEL TANK FILLER SPOUT ATTACHMENT
John G. Trumble, R.R. 2, Big Rapids, Mich. 49307
Original application Aug. 12, 1966, Ser. No. 572,112, now Patent No. 3,384,267, dated May 21, 1968. Divided and this application Jan. 18, 1968, Ser. No. 714,147
Int. Cl. B67b 7/24
U.S. Cl. 222—5     6 Claims

ABSTRACT OF THE DISCLOSURE

A camping device fuel tank assembly for dispensing fuel under pressure to burners, having a pressurized cartridge receiving and aligning means that fits directly into the tank through the threaded protruding filler spout, the filler spout cap being cooperative with such to first seal the fuel tank and then cause puncturing of the cylinder to force the pressurized fuel out a valved discharge from the tank.

---

This application is a divisional application of the parent application entitled Puncturable Gas Cartridge Assembly for a Pressurized Tank, filed Aug. 12, 1966, Ser. No. 572,112 by John G. Trumble.

This invention relates to fuel tank assemblies for portable vaporized fuel combustion devices such as camping stoves, lanterns, heaters, torches, and other like portable units which employ burners that utilize pressure vaporized fuel such as gasoline. More particularly, the invention relates to an insert assembly combined with fuel tank vessels of such units to be pressurized.

In the noted type of units, the gasoline burners are operated by having the fuel in the tank under pressure so that when the fuel is released through a vapor generator, the liquid fuel is vaporized, mixed with air, and conducted to the burner. As is well-known, the internal tank pressure is normally obtained with operation of a manual reciprocating plunger pump on the fuel tank. Such a device, although very dependable, is tedious to operate. It would be desirable, therefore, to be able to pressurize the fuel in a convenient inexpensive manner without this tedious operation. To do this, however, either the pump would have to be power operated, or additional pressurizing means must be used on the fuel tank. Other than the invention set forth in co-pending application Ser. No. 493,445, filed Oct. 6, 1965, now Pat. No. 3,361,298, no mechanism has been known which would accomplish this. It will be realized that the fuel tank must be kept sealed at all times in order to achieve this, and in order to avoid potential hazards, yet must be readily fillable in conventional manner.

It has been found that the attachment assembly described and claimed in the above co-pending application operates very effectively for pressurizing the fuel tank of such units. However, the structure of the device involves components which protrude from the tank and which must be fabricated.

It is an object of this invention to provide a simplified combination of fuel tank and attachment apparatus for vaporized fuel combusting units, that enables the pressurizing action to be achieved by the mere insertion of a conventional pressurizing cylinder into the fuel tank itself.

Another object of this invention is to provide a fuel tank combination enabling a conventional fuel tank to be used, enabling the fuel tank to be filled in conventional manner, and enabling a compressed gas cylinder to be easily dropped into the fuel tank in a retrievable condition, to enable the fuel to be placed under pressure for normal usage with tightening of the filler spout cap, and to enable the pressure cylinder to be easily removed for replacement when empty.

Another object of this invention is to provide insert accessory means combinable with the fuel tank of the burner type unit that employs vaporized fuel, enabling the insertion of a compressed gas cylinder directly into the fuel tank for placing the fuel under compression with attachment of the fuel tank cap.

These and other objects of this invention will become apparent upon studying the following specification in conjunction with the drawings in which:

FIG. 5 is an enlarged sectional view of a third form of the novel assembly shown in use in combination with a fuel tank of the type shown for example in FIG. 3;

FIG. 6 is an enlarged sectional fragmentary view of a fourth form of the assembly;

FIG. 7 is a sectional enlarged fragmentary view of a fifth form of the invention;

FIG. 8 is a sectional enlarged fragmentary view of a sixth form of the invention; and FIG. 9 is a sectional enlarged fragmentary view of a seventh form of the invention.

In the description set forth hereinafter, the term "vaporized fuel combustion device" is intended to include the many portable units such as lanterns, camp stoves, torches, heaters, and other like units used largely for camping and related recreational activities.

FIRST FORM

Figure 1:
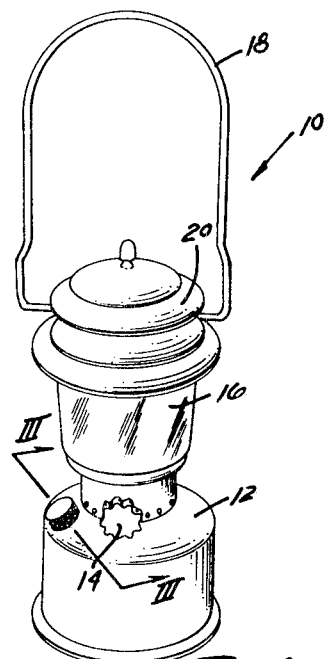
FIG. 1 is a perspective view of one type of portable burner unit employing this invention, specifically, a lantern.

Referring now specifically to the drawings, the device 10 illustrated in FIG. 1 comprises a lantern assembly which includes a gasoline fuel tank 12 which may or may not incorporate a manual pump of the reciprocating piston type having a protruding knob (not shown) and having a fuel control valve that regulates the amount of compressed fuel vapor to the burner mantle of conventional type inside the glass globe 16. A typical carrying handle 18 is mounted to the exhaust chimney 20.

The fuel tank 12 comprises an enclosure which includes a bottom 12', a top 12", and a peripheral enclosure wall 12'''. These form an internal fuel chamber 12a. Extending generally upwardly from one portion of the fuel tank vessel is a filler spout or nipple 24 which defines a generally cylindrical inlet, and includes external threads for threadably engaging an internally threaded closure cap 26.

In combination with the fuel tank is an insert sleeve 28 which has peripheral openings 30 in its walls. Sleeve 28 has an external diameter to closely slidably interfit with the inner-diameter of spout 24, to enable the sleeve to be inserted into the fuel tank, with the upper open end of the sleeve being retained in the neck of spout 24. In the form of the sleeve illustrated in FIG. 3, it includes a radially outwardly extending annular end flange 34 on its upper open end. Beneath this flange and engaging the annular protruding sealer rim 36 of spout 24, is an annular compressible seal 38 such as an enlarged O ring.

The flange outer diameter is smaller than the outer spout diameter to enable cap 26 to fit thereover.

Received in the cap 26 is an annular seal 40 which engages the outer end face of flange 34 to form a seal. Thus, the cap is effectively sealed to the spout. The lower end of sleeve 28 is generally closed by a radially inwardly extending stop portion 42 to limit the insertion of a compressed gas cylinder cartridge 44 placed therein. This locates puncturable end 46 of cylinder 44 with respect to a central puncture element 50 on the inner face of cap 26.

Figure 3:
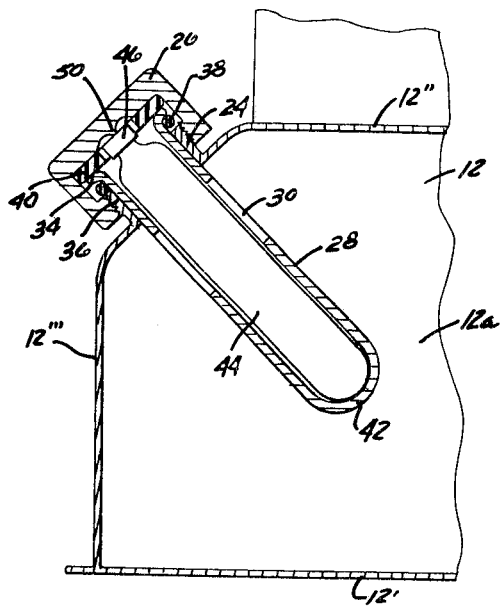
FIG. 3 is a sectional enlarged fragmentary view taken on plane III—III of FIG. 1 and showing the first form of the invention.

During use of the apparatus in FIGS. 1 and 3, the fuel tank is filled in conventional manner with the insert sleeve and the cartridge removed. Thereafter insert sleeve 28 is dropped into the tank, with seal 38 in place on the sleeve, and compressed gas cylinder 44 may be dropped into the tank with sleeve 28 or subsequently, so that its puncturable end is upward. Next cap 26 is attached. The length of the parts are controlled so that seal 40 and seal 38 seal the filler spout first, and then puncture element 50, with further turns of the cap, creates the puncturing action on end 46. The released gas then flows down around cylinder 44, through outlets 30 into the tank to pressurize the fuel. The burners then operate in conventional fashion.

SECOND FORM

Figure 2:
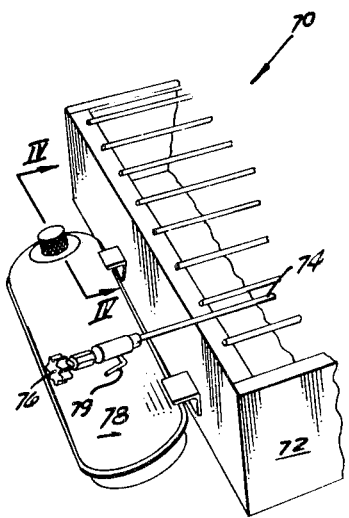
FIG. 2 is a fragmentary perspective view of a second type of unit employing this invention, specifically, a camping stove.
Figure 4:
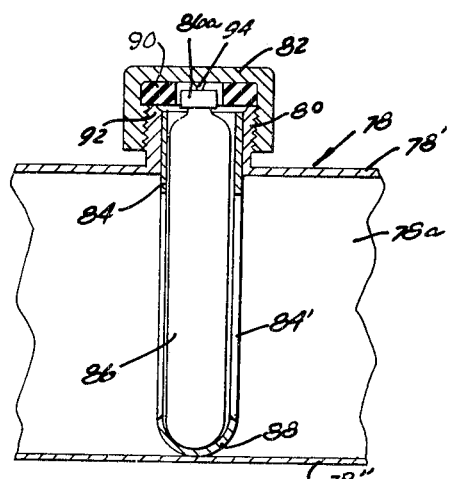
FIG. 4 is a sectional enlarged fragmentary view of the fuel tank portion of the apparatus in FIG. 2, taken on plane IV—IV and showing a second form of the invention.

The invention as employed on a cook stove is shown in FIGS. 2 and 4. Specifically, assembly 70 comprises a cook stove, including the conventional housing 72 containing burners (not shown) and a vaporizer (not show) of conventional type to direct the vaporized fuel from conduit 74 to the burner. Throttle valve tank 78 to conduit 74, and has a conventional air adjust twist valve 79 on its housing for control during initial ignition of the unit.

Fuel tank 78 includes an enclosure having a top 78' and a bottom 78" (FIG. 4), with the cylindrical filler spout 80 extending fromt he top with a nipple type structure having external threads. Cap 82 is threadably engaged with spout 80. Received within the spout and extending down into inner chamber 78a of the fuel tank is the cartridge receiving and alignment sleeve 84 for the compressed gas cylinder cartridge 86. In this instance, cylinder 86 has a sufficient length to extend to the bottom 78" of the fuel tank. The sleeve 84, which is perforate at 84', preferably includes a bottom stop surface 88 to enable the cartridge to be exactly positioned in the sleeve prior to insertion of the sleeve and gas cartridge into the fuel tank. The cylindrical cartridge, however, may be inserted into the sleeve after the sleeve is inserted into the tank, and in such circumstance, bottom 88 may not be formed on sleeve 84, since the cylinder may rest directly on the bottom of the tank. At any rate, the length of the articles are dimensionally controlled such that the sealing occurs first between annular seal 90 in cap 82 and annular rim 92 on spout 80 prior to puncturing of end 86a by the puncture element 94 in cap 82. In this form of the invention, sleeve 84 need not have an upper flange at its open end to engage and limiting insertion of the sleeve into the tank, since engagement with the tank bottom limits its insertion.

THIRD FORM

In FIG. 5 fuel tank 12 receives a modified sleeve 128 which includes a perforate upper end 128' receiving the compressed gas cylinder cartridge 144 retained in the sleeve by a locator portion 128". Portion 128" is located a specific distance along the length of the sleeve so as to enable cooperation with filler cap 26 and seal 40. That is, when cap 26 is tightened down by its threaded connection with spout 24, seal 40 creates a sealed condition between the cap and filler spout rim 36 prior to puncturing of the cartridge. In this form of the invention, puncturable end 146 of cylinder cartridge 144 is in the lower end, adjacent a puncture element 150 built integrally with or secured to member 128" in the sleeve itself. The sleeve does not require an annular flange at its upper end to limit insertion, since it includes a lower extension 128a which protrudes down into abutment with the bottom and/or wall of tank 12 to limit insertion of the sleeve into the tank. Operation of this form of the invention is like that previously described.

It will be realized that this same sleeve extension principle could be employed with a tank of the type shown at 78 in FIG. 2 if desired, or the equivalent.

FOURTH FORM

In FIG. 6, the fourth embodiment 200 is shown to include, in combination with tank 202 (which may be of either type shown in FIGS. 1 and 2), a special type of insert sleeve 204 formed of a sheet metal stamping or of plastic or the like, having a plurality of spaced ribs joined at the bottom to form an end for receiving and aligning the compressed gas cylinder cartridge (not shown). Also, filler spout 206 includes a recessed inner shoulder to receive radially outwardly projecting flange ends 204' on the legs or ribs of the sleeve. Since these are recessed inwardly of rim 208 of the spout against which seal 210 in cap 212 engages, no double seal is required as in the form of the invention shown in FIG. 3. Also, due to flange elements 204' engaging the shoulder, the lower end of the sleeve need not engage the bottom or wall of the fuel vessel. Puncture elements 214 can be in cap 212 as shown, or alternatively, a conventional type of sealing cap can be employed, with the puncture element being retained at the base of the sleeve as shown in phantom at 215.

FIFTH FORM

The fifth embodiment 230 in FIG. 7 is the simplest form of the combination shown thus far, and, although not as desirable in many respects as those shown in the other figures, and although differing in some respects therefrom, it is within the broadest concept presented herein. More particularly, compressed gas cylinder cartridge 232 has its lower end engaging against the bottom 234 of fuel tank 236, (whether the bottom be horizontal as shown in phantom lines at 235). The length of the cartridge is correlated with respect to the fuel tank height and the position of spout 238 and cap 240, and particularly with respect to seal element 242 and puncture element 244 therein, to causet he assembly to first seal and then puncture. Alignment and retention of the cartridge with respect to the tank is obtained by a close sliding interfitting relationship between spout 238 and cylinder 232. Use of the combination is substantially like that previously described.

SIXTH FORM

In combination 260 illustrated in FIG. 8, fuel tank 262 actually has punctuer element 264 integrally formed or attached thereto on bottom 262' of the fuel tank, aligned with inlet spout 266. Cap 268, seal 270, and rim 267 of spout 266 are arranged such that, when cylinder 280 is inserted into the fuel tank, sealing occurs first between the cap and spout before puncturing by element 264 takes place. The incorporation of the puncture element in the tank has the advantage that a conventional cap can be used, but has an initial fabrication disadvantage and a disadvantage because of possible accidental premature puncture if the cartridge is dropped into the fuel tank too vigorously. Here again, as in FIG. 7, no special sleeve providing the alignment is employed, but rather the sliding engagement between cylinder cartridge 280 and spout 266 effectuates alignment and retention.

SEVENTH FORM

Referring to FIG. 9, assembly 300 includes fuel tank 302 having spout 304 with sealing rim 306 sealingly engaging angular seal 308 in cap 310. Cap 310 threadably engages spout 304. The variation in this embodiment is in spacer sleeve 312 which has a reduced lower end interfitting with cartridge 314 to appropriately space the cylinder with respect to cap 310 and its puncture element 313. Spacer 312 may be secured to the bottom 302' of the fuel tank, or alternatively, may be insertable with cylinder 314 by interfitting it tightly therewith prior to insertion into the tank. The operation of this form of the device is substantially like that previously described.

It will thus be observed that with all forms of the invention, even though these differ somewhat, and are distinct from each other, the compressed gas cylinder cartridge is embodied within the fuel tank itself. Thus the filler spout cap appears substantially like the conventional type, without unnecessary protrusions. The assembly can be formed by mass production techniques utilizing simple stamping or other standard forming operations. It is conceivable that certain minor structural deviations may be made from those specifically shown and described, without departing from the concept presented.

I claim:

1. A fuel tank assembly for portable vaporized fuel combustion camping devices, comprising: a fuel tank vessel having an enclosed fuel chamber, a protruding, threaded inlet filler spout to said chamber, and valved fuel discharge means from said chamber; cartridge alignment and positioning means associated with said spout and said chamber and configurated to receive, align and position a cylinder cartridge of compressed gas inserted directly into said vessel chamber; a filler spout cap threadably connectable to said spout, and having sealing means cooperative with said spout to seal said vessel over a cartridge in said vessel chamber; puncture means cooperatively associated with said cap, said sealing means, said receiving, alignment, and positioning means, and said vessel to enable said cap, when tightened, to first seal said vessel by compression of said sealing means, and then to create a puncturing force between said puncture means and a compressed gas cylinder received, aligned and positioned in said chamber for pressurizing the fuel for pressurized discharge through said discharge means.

2. The assembly in claim 1 wherein said alignment and positioning means includes an insert sleeve received in said vessel chamber and having an open cylinder-receiving end retained in said spout.

3. The assembly in claim 2 wherein said sleeve includes radially outwardly extending flange means on said open end, engaging said spout to limit insertion of said sleeve into said vessel, and thereby control the insertion of a cartridge into said vessel.

4. The assembly in claim 1 wherein said puncture means is mounted to the inside of said vessel in axial alignment with said spout.

5. The assembly in claim 3 wherein said puncture means is in said sleeve in its end opposite said open end.

6. The assembly in claim 2 wherein said sleeve has its end opposite said open end in engagement with the inside of said vessel.

References Cited

UNITED STATES PATENTS

| | | | |
|---|---|---|---|
| 611,292 | 9/1898 | Sterne | 222—5 X |
| 620,963 | 3/1899 | Read | 222—5 X |
| 2,628,130 | 2/1953 | Knapp | 222—5 X |
| 2,659,629 | 11/1953 | Graham | 222—399 X |
| 2,684,180 | 7/1954 | Allen | 222—5 |

STANLEY TOLLBERG, Primary Examiner

PO-1050
(5/69)

UNITED STATES PATENT OFFICE
CERTIFICATE OF CORRECTION

Patent No. 3,510,024          Dated May 5, 1970

Inventor(s) John G. Trumble

It is certified that error appears in the above-identified patent and that said Letters Patent are hereby corrected as shown below:

Column 4, line 42;    after "in" and before "phantom", insert --- solid lines, or slanted as shown in ---, Column 4, line 46;    delete "causet he" and insert --- cause the ---, Column 4, line 55;    delete "punctuer" and insert --- puncture ---.

SIGNED AND
SEALED
SEP 22 1970

(SEAL)
Attest:

Edward M. Fletcher, Jr.
Attesting Officer

WILLIAM E. SCHUYLER, JR.
Commissioner of Patents